United States Patent [19]
Patterson

[11] 4,026,125
[45] May 31, 1977

[54] FLEXIBLE DRIVE ADAPTER

[76] Inventor: James T. Patterson, 54 S. Main St., Farmington, Utah 84025

[22] Filed: July 10, 1975

[21] Appl. No.: 594,717

[52] U.S. Cl. .......................................... 64/7; 64/8; 81/177UJ
[51] Int. Cl. .................................. F16d 3/02
[58] Field of Search ...................... 64/7, 8, 1 R, 23; 81/177 UJ

[56] References Cited
UNITED STATES PATENTS

| | | |
|---|---|---|
| 2,140,295 | 12/1938 | Mallard .................................. 64/7 |
| 2,381,102 | 8/1945 | Boyd ...................................... 64/7 |
| 2,997,864 | 8/1961 | Rueb ..................................... 64/7 |
| 3,091,102 | 5/1963 | Linderme ............................... 64/8 |
| 3,855,884 | 12/1974 | McPeak ........................... 81/177 UJ |

*Primary Examiner*—Samuel Scott
*Assistant Examiner*—Randall Heald
*Attorney, Agent, or Firm*—Joseph E. Rusz; James S. Shannon

[57] ABSTRACT

An adapter for installation of the spindle of a portable hand held drill motor and arranged to drive a cutting tool, such as a taper lock reamer. The adapter permits universal movement between the input shaft connected to the spindle of the portable hand held drill motor and the cutting tool and includes means for adjustably regulating the freedom of movement while, dampening any shock transmitted from the cutting tool through the adapter.

5 Claims, 2 Drawing Figures

FLEXIBLE DRIVE ADAPTER

BRIEF DESCRIPTION OF THE INVENTION

1. Field of the Invention

This invention relates to adapters for interconnecting a drive motor of a hand held drill with a cutting tool.

2. Prior Art

It is often necessary, particularly in the aircraft industry that existing fastener holes be reamed oversize or be taper reamed during refurbishing of the aircraft so that "taper lock" fasteners may be used to re-secure members together. A single aircraft, for example, may have as many as 2,000 or more fastener holes and when the fastener holes are originally formed they are drilled during original construction, at the factory, where fixtures and fixed alignment drilling equipment can be used to produce precision holes in the proper location and at the proper angle. During the refurbishing of such aircraft it is desirable that the holes be made oversize or be reamed out so that any weakened material closely around the holes will not result in failure of a section of the airframe. It is usually good practice, and in many cases is very necessary, that in the oversizing or tapering of existing holes the original location and hole angle be maintained. In the past, the oversizing or reaming of such holes has been accomplished by using the same type of fixturing and fixed alignment drilling equipment that has been used at the factory. This has involved the use of drill motors, alignment pins, drill alignment fixtures and other equipment and while precise alignment can be maintained and the enlarged holes obtained are entirely satisfactory, the setting up and using of such equipment requires a great deal of time and means that nearly as much cost is involved in modifying the holes as was expended in originally producing them.

SUMMARY OF THE INVENTION

It is a principal object of the present invention to provide portable, hand held apparatus that can be used to drive a cutting tool and that will allow for some angular disparity between the cutting tool and the drive means for the cutting tool, whereby the cutting tool will be guided by an existing hole even though the drive means may not be fully aligned with the axis of the hole.

Other objects are to provide such a drive means that can be used with existing tools and that is relatively inexpensive.

Still other objects are to provide such a drive means that can be readily adjusted to regulate the extent of relative movement between cutting tool and drive means.

Principal features of the invention include a ball fixed to one end of a shaft, the other end of which has means thereon for attachment to a drive motor that will revolve the shaft. A first socket, telescopes loosely over the shaft to receive a portion of the ball and a bushing of rubber or the like is compressed against the socket and forces the socket against the ball when a retainer cup for the bushing is secured to a second ball socket that carries the cutting tool and that has drive pins inserted into grooves in the ball. The drive pins move in the ball to allow relative angular displacement of the second ball socket with respect to the shaft while insuring positive rotation of the second ball socket and the cutting tool carried thereby when the shaft is rotated.

Additional objects and features will become apparent from the following detailed description, taken together with the accompanying drawing.

THE DRAWING

In the Drawing:

FIG. 1 is a perspective view of the flexible drive adapter of the invention; and FIG. 2, is a vertical section view, taken on the line 2—2 of FIG. 1.

DETAILED DESCRIPTION

Figure 1:
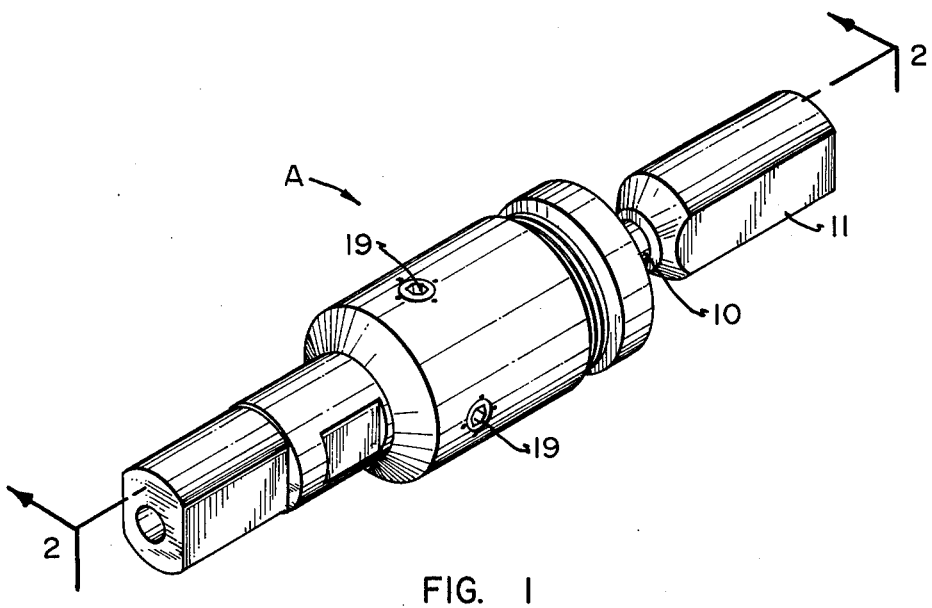
Figure 2:
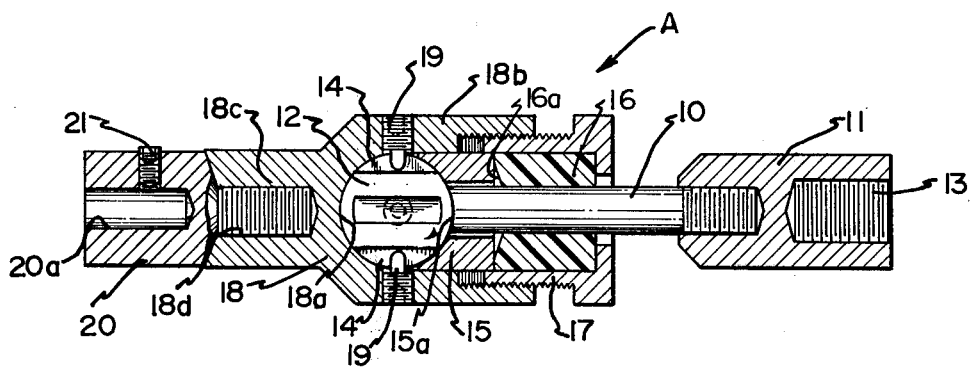

Referring now to the Drawing:

In the illustrated preferred embodiment, the flexible drive adapter, shown generally at A, includes a shaft 10 with a coupling 11 on one end thereof and a ball 12 on the other end.

The coupling 11 is bored and threaded at 13 to receive an output shaft of a drive motor (not shown) or, if desired, coupling 11 can be threaded off shaft 10 and the shaft can be secured in conventional fashion to a chuck (not shown) on the end of a drill motor (not shown) or other drive means.

Ball 12 has a plurality of grooves 14 equally spaced therearound for a purpose to be further explained, and a first socket member 15 is telescoped over shaft 10 to seat a spherically curved portion 15a against the ball.

A flexible bushing 16, which may be made of rubber or the like, is telescoped tightly over the shaft 10 and has a dish-shaped end 16a, the outer edge 16b of which is in engagement with the first socket member 15 at the side opposite portion 15a. The bushing 16 fits snugly within a retainer cup 17 that is loosely fitted on the shaft 11.

A second socket member 18 has an spherically curved inner portion 18a in which a portion of ball 12 seats and a skirt portion 18b that extends around the ball 12 and that is threaded onto retainer cup 17. Pins 19 are threaded through the skirt portion 18b to extend into each of the grooves 14 formed in ball 12. The socket member 18 has a projecting neck 18c that is bored and interiorly threaded at 18d to receive a threaded end of a coupling 20 that is adapted to receive a cutting tool, i.e. a bit, a reamer, etc. The cutting tool (not shown) is inserted into the bore 20a of coupling 20 and is held in place by a set screw 21 that is threaded through the coupling and into the bore 20a.

The grooves 14 are just large enough to allow the pins 19 to fit therein and allow the second socket member 18, the retainer cup 17 and any cutting tool affixed to the second socket member to angularly tilt with respect to the shaft 10, the coupled ball and socket arrangement forming in effect a universal joint between rotary members 18 and 10. During such tilting, the bushing 16 is compressed and tends to return the members to their aligned relationship. The pins 19 engage the walls of grooves 18 to positively rotate the second socket member 18 and cutting tool carried thereby with shaft 10.

In operation, the cutting tool (not shown) is inserted in bore 20a and is secured in place with set screw 21. The shaft 10 is connected to a drive motor such as, for example, a drill motor, and the unit is ready for use. When used for a reaming operation, for example, the cutting tool is directed into a previously cut hole. Even if the shaft 10 is not exactly an alignment with the axis of the hole the cutting tool will automatically follow the axis and the ball will allow for angular displacement between the cutting tool and the axis of shaft 10.

The degree of angular movement allowed, and the ease with which such movement can occur is determined by the extent to which the second socket member 18 and the retainer cup 17 are threaded together, thus pressing the bushing 16 against the first socket member 15 and compressing the ball member between the first and second socket members.

Further, the compression of bushing 16 between socket member 15 and the closed end of cup 17 as the cup is threaded into extension 18b of member 18 increases the pressure which the bushing exerts outward against the wall of the cup cavity and inward against shaft 10, thereby increasing the resistance offered by the bushing to angular displacement of the axis of rotation of either of members 18 and 10 relative to the axis of rotation of the other. By controlling the degree of compression of bushing 16 in this manner, the resistance to angular displacement may be adjusted to suit the size of the tool being used.

Although a preferred embodiment of my invention has been herein disclosed, it is to be understood that the present disclosure is by way of example and that variations are possible without departing from the subject matter coming within the scope of the following claims, which subject matter I regard as my invention.

I claim:
1. A flexible drive adapter comprising:
   a. first and second rotary members having their axes of rotation normally in alignment;
   b. a universal joint coupling said rotary members;
   c. said first rotary member having a cylindrical surface concentric with its axis of rotation and spaced from said universal joint;
   d. said second rotary member having an extension reaching beyond said universal joint in the direction of said first rotary member and providing a cylindrical cavity that is concentric with the axis of rotation of said second rotary member, that is of larger diameter than the cylindrical surface of said first rotary member, and that contains said cylindrical surface; and
   e. a bushing of rubber or like material filling the space between the cylindrical wall of said cavity and said cylindrical surface for offering resilient resistance to any angular displacement of the axis of rotation of either rotary member relative to the axis of rotation of the other member.

2. Apparatus as claimed in claim 1 and in addition means for applying an adjustable compressive force to said bushing in a direction parallel to the axis of rotation of said second rotary member for controlling the amount of said resistance.

3. A flexible drive adapter comprising;
   a. first and second rotary members having their axes of rotation normally in alignment, said first rotary member being a shaft;
   b. a ball on one end of said shaft centered on its axis of rotation;
   c. said second rotary member having a blind bore concentric with its axis of rotation, said bore terminating at its closed end in a spherical surface forming one part of a two-part socket for said ball and terminating at its open end in a counterbore;
   d. an annular element surrounding said shaft and forming the other part of said socket, said annular element having an outer diameter providing a sliding fit in said bore, a central opening larger than said shaft, and a spherical surface facing said ball;
   e. a torgue transmitting coupling between said second rotary member and said ball, said coupling permitting angular displacement of the axis of rotation of either rotary element with respect to the axis of rotation of the other rotary element in any direction;
   f. said second rotary member also having adjustable means for simultaneously providing both pressure between said ball and its socket and resilient resistance to said angular displacement, said means comprising a cup-shaped element having an open end threaded into said counterbore and partially receiving said annular element and having a closed end with a central opening larger than said shaft for the passage of said shaft, and a bushing of rubber or like material in said cup-shaped element surrounding said shaft and extending between the closed end thereof and said annular element, whereby the extent of entry of said cup-shaped element into said counterbore determines the amount of compression of said bushing and thereby determines both the pressure between said ball and its socket and the resistance offered by said bushing to said angular displacement.

4. Apparatus as claimed in claim 3 in which said bushing is dish-shaped at the end in contact with said annular element.

5. Apparatus as claimed in claim 3 in which said torque transmitting coupling consists of pins carried by said second rotary member which extend into corresponding slots situated at ninety degree intervals on the surface of said ball.

* * * * *